(12) United States Patent
Krueger

(10) Patent No.: US 7,943,219 B2
(45) Date of Patent: May 17, 2011

(54) FILMS AND ARTICLES WITH REVERSIBLE OPACITY CHANGE UPON STRETCHING, AND METHODS OF MAKING AND USING SAME

(75) Inventor: Jeffrey Jennings Krueger, Roswell, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 144 days.

(21) Appl. No.: 11/690,604

(22) Filed: Mar. 23, 2007

(65) Prior Publication Data

US 2008/0233418 A1 Sep. 25, 2008

(51) Int. Cl.
   *B32B 1/02* (2006.01)
   *B32B 1/08* (2006.01)
(52) U.S. Cl. ............. 428/35.7; 428/34.1; 428/34.2; 428/35.9; 428/36.9
(58) Field of Classification Search ............ 428/34.1, 428/34.2, 35.7, 35.9, 36.9
   See application file for complete search history.

(56) References Cited

U.S. PATENT DOCUMENTS

| | | | |
|---|---|---|---|
| 3,034,395 A | 5/1962 | Zandman | |
| 3,551,025 A | 12/1970 | Bingham et al. | |
| 3,671,105 A | 6/1972 | Williams et al. | |
| 4,206,980 A * | 6/1980 | Krueger et al. | 359/290 |
| 4,436,213 A | 3/1984 | Paul, Jr. et al. | |
| 4,483,965 A * | 11/1984 | Ohba et al. | 525/322 |
| 4,749,856 A | 6/1988 | Walker et al. | |
| 4,978,476 A | 12/1990 | Allen et al. | |
| 4,985,531 A | 1/1991 | Fujii et al. | |
| 5,044,725 A | 9/1991 | DeMartino et al. | |
| 5,248,455 A | 9/1993 | Joseph et al. | |
| 5,474,730 A | 12/1995 | Gust et al. | |
| 6,168,840 B1 | 1/2001 | Johnstone | |
| 6,764,566 B1 | 7/2004 | Griesbach, III et al. | |
| 6,821,612 B1 * | 11/2004 | Melik et al. | 428/221 |
| 6,853,424 B2 | 2/2005 | Elman et al. | |
| 7,232,871 B2 * | 6/2007 | Datta et al. | 526/160 |
| 7,390,866 B2 * | 6/2008 | Datta et al. | 526/339 |
| 2002/0007167 A1 * | 1/2002 | Dan et al. | 604/378 |
| 2002/0028857 A1 | 3/2002 | Holy | |
| 2005/0107530 A1 * | 5/2005 | Datta et al. | 525/70 |
| 2006/0148915 A1 | 7/2006 | Floyd et al. | |

FOREIGN PATENT DOCUMENTS

| | | |
|---|---|---|
| EP | 0741639 B1 | 10/2005 |
| GB | 951768 | 3/1964 |
| JP | 4270321 A | 9/1992 |
| JP | 2004331944 | 11/2004 |
| WO | 8504262 | 9/1985 |
| WO | 2005072327 | 8/2005 |

OTHER PUBLICATIONS

Ferdinand Rodriguez, Principles of Polymer Systems, Fourth Edition, 1996, pp. 64-67.

* cited by examiner

*Primary Examiner* — Marc A Patterson
(74) *Attorney, Agent, or Firm* — Armstrong Teasdale LLP

(57) ABSTRACT

A composition which exhibits a reversible non-linear reduction in opacity as the composition is stretched from a first length to a second length is disclosed. One embodiment is a film comprising an elastomeric polymer medium and regions having crystalline properties disposed in the polymer medium, where the film exhibits the reversible non-linear reduction in opacity upon being stretched.

29 Claims, 5 Drawing Sheets

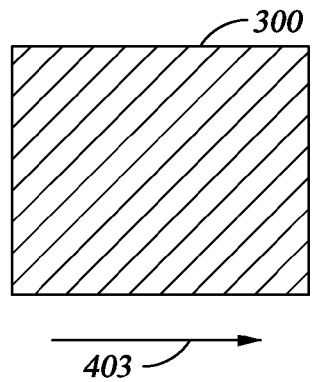
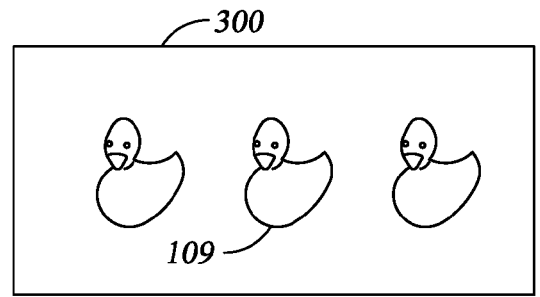
Fig. 4A               Fig. 4B
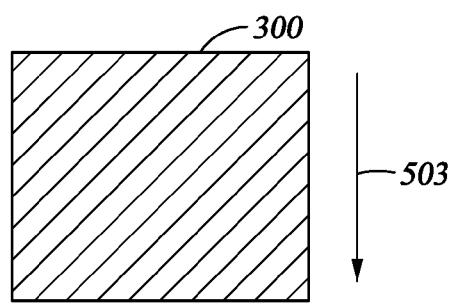
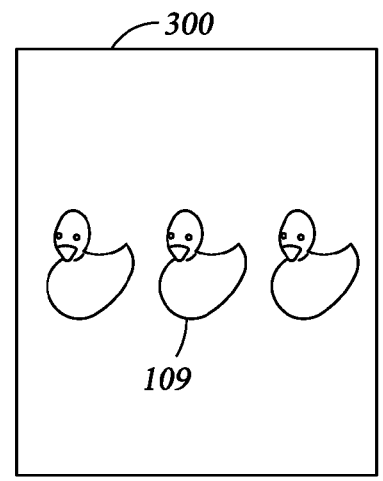
Fig. 5A               Fig. 5B

FILMS AND ARTICLES WITH REVERSIBLE OPACITY CHANGE UPON STRETCHING, AND METHODS OF MAKING AND USING SAME

BACKGROUND OF THE INVENTION

Polymer based films comes in a variety of forms, shades, and color. Many polymer based films may be elongated by a stretching force and may revert back to an original length upon cessation of the stretching force. Films made from amorphous polymers will typically maintain a consistent transparency or opacity while being stretched from a first length to a second length, and any potentially observed reduction in opacity may be the result of the film becoming thinner (as opposed to any other chemical or physical changes in the film). Accordingly, the reduction in opacity as the film is stretched is substantially linear. Films made from crystalline or semicrystalline polymers typically increase in opacity during stretching from a first length to a second length, and often the increase in opacity is irreversible. That is, even after any applied tension is removed and the film is allowed to return to an unstretched state, the opacity may be unchanged relative to the stretched state. Thus, known polymer based films do not exhibit reversible nonlinear reduction in opacity as the film is stretched.

Therefore, there exists a need for a polymer based film which exhibits a reversible non-linear reduction in opacity as the film is stretched.

SUMMARY OF THE INVENTION

Embodiments of the present invention generally relate to films exhibiting a non-linear reduction in opacity in response to elongation. In one embodiment, a film is provided which includes a first polymer of at least one elastomeric polymer, and a second polymer of at least one polymer having one of crystalline or semicrystalline properties. The second polymer forms crystalline regions disposed in the first polymer. The film exhibits a reversible non-linear reduction in opacity as the composition is stretched from a first length to a second length. In one embodiment, the first polymer may include an ethylene octene copolymer with polypropylene forming the crystalline regions within the first polymer. The film may also include at least one olefin elastomer disposed in the first polymer. In one embodiment the reversible non-linear reduction in opacity occurs upon the film being stretched between about 1.5 times the first length of the composition and about 2 times the first length of the film. In one embodiment, the reversible non-linear reduction in opacity may include a first rate of opacity reduction, a second rate of opacity reduction and a third rate of opacity reduction as the film is stretched from the first length to the second length. The second rate of opacity reduction may be between about 2 times and about 5 times greater than the first and third rates of opacity reduction. The film may also include a skin layer on at least one surface of the film. In one embodiment, the composition, prior to exhibiting the reversible non-linear reduction in opacity, exhibits a non-reversible increase in opacity upon being stretched from the first length to the second length and subsequently relaxed.

In another embodiment, an article is provided, which includes a film core of at least one polypropylene having crystalline properties and at least one olefin elastomer suspended in at least one ethylene octene copolymer, and a polyethylene skin layer on at least one surface of the film core. The film core may have a polypropylene to ethylene octene ratio such that the film core exhibits a reversible non-linear reduction in opacity as the film core is stretched from a first length to a second length.

In yet another embodiment, a method for making an article with a reversible opacity change characteristic is provided. The method includes blending at least one transparent polymer with at least one polymer having crystalline properties to form a composition, and extruding the composition to form a film. The at least one polymer having crystalline properties may be suspended within the transparent polymer and the film may exhibit a reversible non-linear reduction in opacity as the film is stretched from a first length to a second length.

In various embodiments, the film, article or composition of the present invention may be at least one of adult incontinence products, sanitary napkins, disposable diapers, garments, protective gear, bandages, surgical gowns, surgical drapes, facemasks, head coverings, surgical caps, shoe coverings, sterilization wraps, surgical gloves, dilatation balloons, inflatable cuffs, external catheters, catheter balloons, instrument covers, warming blankets, and heating pads.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 4A and 4B illustrate a film which is stretched in a machine direction, according to one embodiment of the invention;

FIGS. 5A and 5B illustrate a film which is stretched in a cross direction, according to one embodiment of the invention;

DETAILED DESCRIPTION

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Elastomeric polymer-based compositions (e.g., films) exhibiting reversible changes in opacity as the compositions are stretched are provided. In one embodiment, the change in opacity is nonlinear. That is, the rate at which the opacity changes relative to elongation varies as the composition is stretched. For example, a composition that is stretched from an initial length to a final length may exhibit a marked change in the rate at which the opacity of the composition changes for a relatively well-defined region of the overall elongation of the composition. More specifically, the composition may exhibit a first rate of change in opacity for a first region of elongation, a second rate of change in opacity for a second region of elongation and a third rate of change in opacity for a third region of elongation, where the second rate of change in opacity is substantially greater than the first rate of change and the third rate of change in opacity. Upon releasing the stretching force the composition may return to its original length and opacity. Subsequent application of a sufficient stretching force can again cause the composition to be stretched from an initial length to a final length and exhibit the nonlinear change in opacity.

Figure 1:
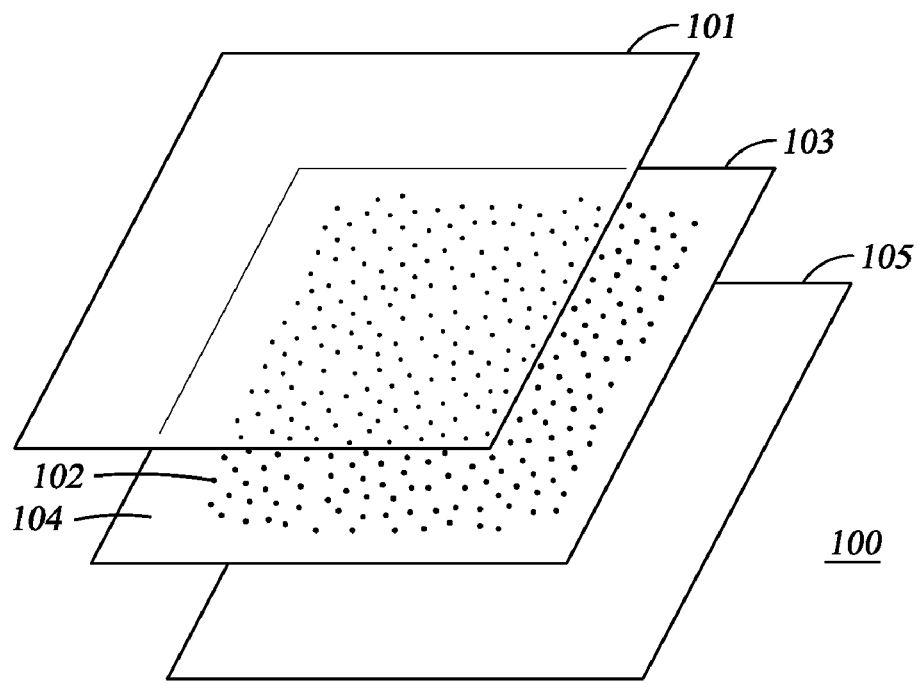
FIG. 1 illustrates a perspective view of a film, according to an embodiment of the invention.

FIG. 1 illustrates a perspective view of film 100 according to an embodiment of the invention.

In one embodiment, the film 100 may have a first layer 101, a second layer 103, and a third layer 105. At least one layer of the film 100, for example the second layer 103, or core layer, may be a polymer blend which includes a polymer medium 104 having regions exhibiting crystalline properties. Illustratively, FIG. 1 shows such crystalline regions as crystallites 102 disposed within the polymer medium 104. Thus, the crystallites 102 may be the crystalline regions of a polymer which possesses crystalline properties. In one embodiment, the crystallites 102 may be disposed within the medium 104 that may form the bulk of the second layer 103. In this regard it should be noted that reference to the crystallites 102 being disposed in the medium 104 contemplates the crystallites as separate (separable) entities from the medium 104 (i.e., suspended with the medium), or being structurally integrated with the polymer medium 104. Further, the size of the crystallites 102 and the spacing (density) in-between individual crystallites 102 of FIG. 1 are not drawn to scale, but are shown to illustrate that the crystallites are disposed within the second layer 103. In various embodiments, the crystallites 102 may be in a semicrystalline state or a crystalline state.

The crystalline state of polymers may occur when the polymers have a highly stereoregular structure with little or no chain branching or when the polymer contains highly polar groups that give rise to strong dipole-dipole interactions. Thus, crystalline polymers are packed in a highly ordered arrangement. In contrast, an amorphous state may be considered to be a randomly tangled mass of polymer chains. Amorphous polymers also show softening behaviors at the glass transition temperature, but no true melt or first order transition.

The semicrystalline state of polymers is one in which long segments of the polymer chains appear in both amorphous and crystalline states or phases. The crystalline phase of the semicrystalline polymer contains multiple lattices in which the polymer chain assumes a chain-folded conformation (lamellae) in which there is a highly ordered registry in adjacent folds of the various chemical moieties of which the chain is constructed. The packing arrangement (short order orientation) within the multiple lattices is highly regular in both its chemical and geometric aspects. Semicrystalline polymers show characteristic melting points, above which the multiple lattices become disordered and rapidly lose their identity. Whether a particular material exhibits crystalline properties, as opposed to being amorphous, can be determined by observing X-ray diffraction patterns of the respective materials. Polymers (or copolymers) in a semicrystalline state or a crystalline state are characterized by an X-ray diffraction pattern having either concentric rings or a symmetrical array of spots, which are indicative of the nature of the crystalline order. In contrast, amorphous polymers may have an X-ray diffraction pattern of a diffuse halo, which indicates little or no regularity in the polymer structure.

In one embodiment, the crystallites 102 may be predominantly linear polymers having a regular structure. Examples of semi-crystalline or crystalline, polymers that may be used to form the crystallites 102 in embodiments of the present invention include polyolefins, polyesters, polyamides, polycarbonates, and copolymers and blends thereof.

Suitable polyolefins include polyethylene, e.g., high density polyethylene, medium density polyethylene, low density polyethylene and linear low density polyethylene; polypropylene, e.g., isotactic polypropylene, syndiotactic polypropylene, blends of isotactic polypropylene and atactic polypropylene; polybutylene, e.g., poly(1-butene) and poly(2-butene); polypentene, e.g., poly(1-pentene) and poly(2-pentene); poly(3-methyl-1-pentene); poly(4-methyl-1-pentene); and copolymers and blends thereof.

The semicrystalline or crystalline polyethylene-based polymers, for instance, may have a melt index of greater than about 5 grams per 10 minutes, and in some embodiments, greater than about 10 grams per 10 minutes at 190° C., as well as a density of greater than about 0.910 grams per cubic centimeter ($g/cm^3$). In other embodiments, the aforementioned semi-crystalline or crystalline polyethylene-based polymers may have a density of greater than about 0.915 $g/cm^3$. In still other embodiments, the aforementioned semi-crystalline or crystalline polyethylene-based polymers may have a density from about 0.915 to about 0.960 $g/cm^3$. In yet other embodiments the aforementioned semicrystalline or crystalline polyethylene-based polymers may have a density from about 0.917 and 0.960 $g/cm^3$. Specific examples of such polyethylene-based polymers include Dow polyethylenes such as DOWLEX 2517, Dow LLDPE DNDA-1082, Dow LLDPE DNDB-1077, Dow LLDPE 1081, and Dow LLDPE DNDA 7147. In some instances, higher density polymers may be useful, such as Dow HDPE DMDA-8980. Other suitable polyethylene-based polymers include Escorene LL 5100 and Escorene LL 6201 from ExxonMobil.

Likewise, the semicrystalline or crystalline polypropylene-based polymers may have a melt index of greater than about 10 grams per 10 minutes at 190° C. and in some embodiments, greater than about 20 grams per 10 minutes at 190° C., as well as a density of from about 0.89 to about 0.90 $g/cm^3$. Specific examples of such polypropylene-based polymers include ExxonMobil PP 3155, PP1O74KN, and PP9O74MED and Dow Plastics 6D43.

Suitable copolymers include random and block copolymers prepared from two or more different unsaturated olefin monomers, such as ethylene/propylene and ethylene/butylene copolymers.

Suitable polyamides include nylon 6, nylon 6/6, nylon 4/6, nylon 11, nylon 12, nylon 6/10, nylon 6/12, nylon 12/12, copolymers of caprolactam and alkylene oxide diamine, and the like, as well as blends and copolymers thereof.

Suitable polyesters include poly lactide and poly lactic acid polymers as well as polyethylene terephthalate, poly-butylene terephthalate, polytetramethylene terephthalate, polycyclohexylene-1,4-di-methylene terephthalate, and isophthalate copolymers thereof, as well as blends thereof.

In one embodiment, the polymer medium 104 may be visibly transparent, and may include one or more elastomeric polymers (elastomers). Elastomeric polymers suitable for use in the various embodiments may have the capability of being stretched to at least N times their original length, where N is a number (fraction or whole) greater than 1. According to a particular embodiment, N is three (3). In one embodiment, the polymer medium 104 may also be in a low crystalline state or in an amorphous state.

The polymer medium 104 may include a first elastomeric polymer, such as, for example, elastomeric polyesters, elastomeric polyurethanes, elastomeric polyamides, elastomeric polyolefins, elastomeric copolymers, combinations thereof, derivatives thereof, and so forth.

Suitable elastomeric copolymers include ethylene vinyl acetate (EVA), such as ESCORENE ULTRA EVA, available from ExxonMobil Chemical Company, and ELVAX EVA, available from E. I. Du Pont de Nemours and Company; ethylene-octene copolymers such as AFFINITY copolymers, available from Dow Plastics and EXACT copolymers, available from ExxonMobil Chemical Company; and ethylene-propylene copolymers such as VISTAMAXX copolymers, available from ExxonMobil Chemical Company.

Examples of elastomeric polyolefins include ultra-low density elastomeric polypropylenes and polyethylenes, such as those produced by "single-site" or "metallocene" catalysis methods. Such elastomeric olefin polymers are ACHIEVE (propylene-based), available from ExxonMobil and EXCEED (ethylene-based), available from ExxonMobil. Suitable elastomeric olefin polymers also include ENGAGE (ethylene-based), available from DuPont Dow Elastomers, LLC (a joint venture between DuPont and the Dow Chemical Co.).

Suitable elastomeric polyesters include HYTREL, available from E. I. Du Pont de Nemours and Company. Suitable elastomeric polyurethanes include ESTANE, available from Noveon, Inc.

In one embodiment, the second layer 103 (i.e., the polymer medium 104) may further include a second elastomer having a crystallinity range in-between the crystallinity ranges of the low crystallinity or amorphous first elastomeric polymer and the crystallites 102. The second elastomer may work to enhance the geometrical spacing between the crystillites (or dispersion of the crystallites) in the polymer medium 104. Suitable second elastomers are elastic polyolefin-based polymers such as VISTAMAXX elastomer, available from ExxonMobil Chemical Company. Other examples of suitable polyolefin-based polymers include EXACT plastomer, OPTEMA ethylene methacrylate, and VISTANEX polyisobutylene, and metallocene-catalyzed polyethylene, all available from ExxonMobil Chemical Company, as well as AFFINITY polyolefin plastomers, such as AFFINITY EG 8185, AFFINITY GA 1900, AFFINITY GA 1950, and VERSIFY propylene-ethylene copolymers available from Dow Chemical Company, ELVAX ethylene vinyl acetate, available from E. I. Du Pont de Nemours and Company, and ESCORENE ULTRA ethylene vinyl acetate, available from ExxonMobil Chemical Company.

Thus, in one embodiment, the polymer medium 104 of the second layer 103 may include only one elastomer (e.g., one of the first elastomers given above), or may include two or more elastomers, such as combinations of the first and second elastomers given above. In one embodiment, a first elastomer may have a ratio of between about 50 wt % and about 95 wt %, preferably between about 70 wt % and about 90 wt %. The crystallite 102 forming polymer may be included at a ratio of between about 1 wt % and about 10 wt %, preferably between about 2 wt % and about 5 wt %. The second elastomer may be included at a ratio of between about greater than 0 wt % and about 40 wt %, preferably between about 5 wt % and about 20 wt %.

In one embodiment, the first layer 101 and third layer 105 may be skin layers forming the exterior layers of the film. Examples of possible polymers that may be used alone or in combination as skin layers include homopolymers, copolymers and blends of polyolefins as well as polymers and/or copolymers of ethylene vinyl acetate, ethylene ethyl acrylate, ethylene acrylic acid, ethylene methyl acrylate, ethylene butyl acrylate, and/or ethylene vinyl alcohol, and other thermoplastic polymers, including but not limited to, polyesters such a poly(ethylene terephthalate), nylons or polyamides, polystyrene, polyurethane, homopolymers and copolymers of lactic acid and olefinic thermoplastic elastomers which are multistep reactor products wherein an amorphous ethylene propylene random copolymer is molecularly dispersed in a predominately semicrystalline high polypropylene monomer/low ethylene monomer continuous matrix. In one embodiment, the commercially available polymers that may be used to form the skin layers 101, 105 include Dowlex 2036G, a film grade linear low density polyethylene manufactured by Dow Chemical. The skin layers may be present at a ratio of between about 1 wt % and about 20 wt % of the total film weight, and preferably between about 1 wt % and about 5 wt % of the total film weight.

In addition, any layer of film 100 may further include pigments, dyes, flame retardants, stabilizers, or other additives. Furthermore, the film 100 may in embodiments of the invention include more or less layers than depicted in FIG. 1. In particular, it is contemplated that a film of one embodiment may by a single layer film including only the polymer medium with the crystalline regions (i.e., the second layer 103 of the film 100 shown in FIG. 1). In another embodiment, only one skin layer (e.g., either the first skin layer 101 or the second skin layer 105) is disposed on the second player 103. Further, additional layers may be incorporated as desired.

In one embodiment, the film 100 exhibits increasing transparency as the film is stretched. In a particular embodiment, the film may be transparent to the naked eye upon film formation (e.g., after being manufactured by the coextrusion film apparatus 200 described below). However, after stretching the film to between about 3 times its length and about 11 times its length, and then letting the film return to an unstretched relaxed state, the film acquires visibly opaque states. The rate of stretching may be between about 1 inch/min and about 100 inches/min. In one embodiment, the stretching rate may be about 20 inches/min. Subsequent stretching of the film results in the opaque film showing a non-linear reduction in opacity in response to the stretching or elongation. Thus, as the film is stretched over a first range of elongation, the film exhibits a first rate of opacity reduction. (Not to be confused with the rate of stretching, the rate of opacity reduction is defined as the change in opacity per change in elongation.) Then, as the film is further stretched over a second range of elongation, the film exhibits a second rate of opacity reduction. The second range of elongation may be between about 30% elongation and about 500% elongation relative to the opaque unstretched relaxed state, preferably between about 50% and about 100%. The second rate of opacity reduction may be between about 2 times and about 5 times greater than the first rate of opacity reduction. Subsequently, as the films are stretched over a third range of elongation, the films exhibit a third rate of opacity reduction. In one embodiment, the third rate of opacity reduction is less than the second rate of opacity reduction, and may be similar to the first rate of opacity reduction. Upon subsequent relaxation of the films 100 and 300A and 300B (i.e., removal of any stretching force (tension) and allowing the film to assume an unstretched state), the films again turn opaque. It is contemplated the film may not be perfectly elastic, such that the film may be somewhat longer (in the stretched direction) after being stretched and then allowed to relax.

In one embodiment, the reduction in opacity observed during the second range of elongation may be visually observed, as the film visually and abruptly turns from an opaque state to a transparent state.

Not wishing to be bound by this theory, the inventor believes that the crystallites 102 in the unstretched and relaxed state of second layer 103 diffracts light and provides opacity to the film. Upon stretching of the film to a certain point the crystallites 102 obtain sufficient spacing so as to allow light to pass through the film and the film appears transparent.

In embodiments of the invention, the film may have sufficient elasticity, such that the stretched film may, upon removal of the stretching force, contract to a length corresponding to between about 100% and 150% of the unstretched/relaxed length, and preferably between about 100% and about 120% of the unstretched/relaxed length, and more preferably between about 100% and 110% of the unstretched/relaxed length.

Various methodologies may be applied to determine how the opacity of a given film responds to being stretched. For example, opacity measurements may be performed according to the TAPPI 519 Diffuse opacity method. A suitable apparatus for this use may be a spectrophotometer, such as the SPECTRAFLASH SF600-CT, available from Datacolor. The film may be clamped (e.g. on a jig) with no, or minimal, tension being placed on the film (e.g., approximately zero elongation of the film). The opacity of the film may then be measured against different backdrops of known standards. For example, the opacity of the film may be measured with a black colored known standard behind the film, and then with a white colored known standard behind the film. Using the two measurements the spectrophotometer can calculate the opacity of the film. The film may then be elongated (stretched) on the jig along at least one axis. For example, the film can be stretched in a machine direction and/or a cross direction (the cross direction being orthogonal to the machine direction).

The opacity of a film is measured for various amounts of elongation. A 4-inch wide by 4-inch long film sample is securely clamped across the width at both ends in a jig that allows length-wise elongation (direction of elongation) of the film. Specifically, one longitudinal end of the film is clamped in a fixed clamp of the jig, and the other longitudinal end of the film is clamped in an adjustable clamp of the jig leaving a 3.5 inch gauge length between the clamps. An initial opacity measurement is made before any extension of the film is done. The adjustable clamp is then incrementally adjusted to stretch the film along the direction of elongation. Opacity of the film sample is measured on the basis of units of length or on the basis of percent elongation. Opacity measurements are performed every ¼ inch of film elongation, which corresponds to approximately 7% of film elongation based on the initial 3.5 inch gauge length. When the film has been elongated to about 80% of the elongation at which rupture of the film would occur (which rupture elongation can be predetermined by subjecting another sample of the film to the same test, but continuing to extend the film by ¼" steps until the sample ruptures), the process can be reversed to remeasure the opacity of the film at the same elongation points as the film retracts. A final opacity measurement is made after the film is returned to the initial gauge length of 3.5 inches. Reversible reduction in opacity occurs when the final opacity of the film returns to desirably at least about 80% of the initial opacity, more desirably to at least about 90% of the initial opacity, and even more desirably to at least about 95% of the initial opacity.

The opacity measurements may be graphed as a function of the elongation. The graph's derivative may be determined by displaying a change in opacity ($\Delta_{Opacity}$) divided by a change in percent elongation ($\Delta_{\% \, Elongation}$), and is an indication of the rate of opacity reduction. Thus, the first range of elongation may be defined as the elongation range wherein the rate of opacity reduction is above about $-20 \, \Delta_{Opacity}/\Delta_{\% \, Elongation}$, and the second range of elongation may be defined as the range wherein the rate of opacity reduction is below about $-20 \, \Delta_{Opacity}/\Delta_{\% \, Elongation}$.

Figure 2:
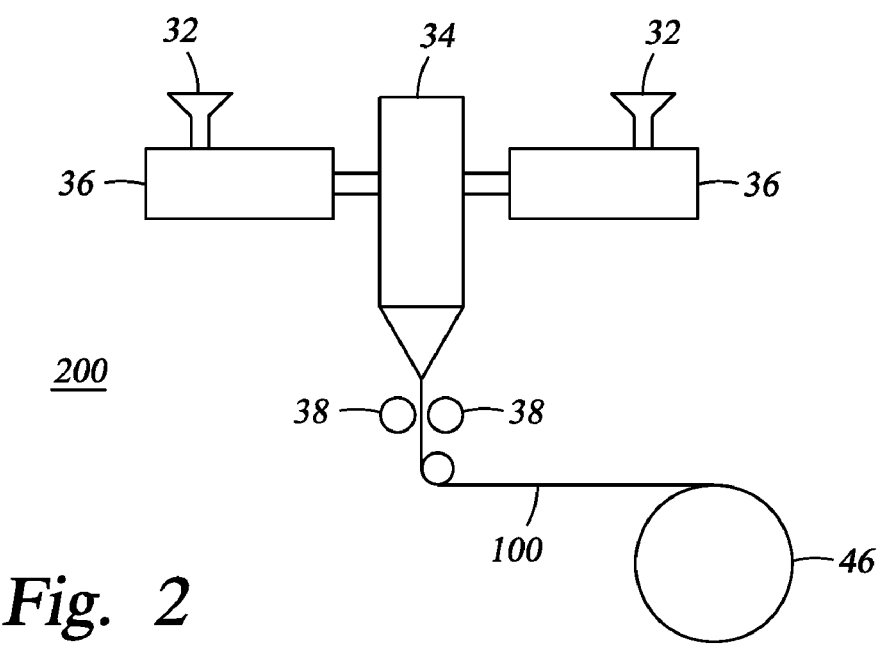
FIG. 2 illustrates an apparatus for forming a film, according to an embodiment of the invention.

In one embodiment, a film may be manufactured by an extrusion process. In a particular embodiment, a multilayered film is manufactured by co-extrusion. FIG. 2 depicts a coextrusion film apparatus 200 for forming a multilayered film 201 (such as the film 100 of FIG. 1), according to one embodiment. Typically, the apparatus 200 will include two or more hoppers 32A-B attached to two or more polymer extruders 36A-B. The polymer extruders 36A-B may be attached to a coextruder 34 which may include a multi-slotted die. In one embodiment of fabrication, the film 201 is extruded at about 400° F. into a pair of nip or chill rollers 38 maintained at about 70° F. One of the chill rollers 38 may be patterned so as to impart an embossed pattern to the film 201. This may reduce the gloss of the film and give it a matte finish. In another embodiment, the film 201 is extruded onto a chilled roll which can have a smooth or matte finish. Typically, the film 201, as initially formed, will have an overall thickness of approximately 25 to 60 micrometers with, in the case of multilayer films, the total skin or bonding layer having an initial thickness that may be about 1% to 30% of the total thickness, for example.

From the coextrusion film apparatus 200 the exiting film 201 may be directed to a film stretching unit as described in U.S. Pat. No. 6,764,566, the disclosure of which is herein incorporated in its entirety. Film 201 may then be wound up into a roll 46 for subsequent processing. Alternatively, the film 201 may continue in-line for further processing or conversion.

As shown, the apparatus 200 includes two hoppers 32 and two extruders 36. Accordingly, one of the hoppers 32A and corresponding extruders 36A may be configured to produce a film layer corresponding to the second layer 103 of FIG. 1, while the other hopper 32B and corresponding extruder 36B may be configured to produce a skin layer (e.g., one of either the first layer 101 or the third layer 105 of FIG. 1). In another embodiment, the hopper containing the materials for the skin layers (e.g., hopper 32A) may be connected to two, separate extruders, each extruder producing a separate one of the skin layers 101 and 105. The two skin layer extruders and the core layer extruder may then be arranged to produce the multilayered film 100 shown in FIG. 1.

While the apparatus 200 shown in FIG. 2 is configured as a co-extruder for making multilayered films, it is also contemplated that single layer films may be produced. For example, the core layer (i.e., the second layer 103) of the film 100 shown in FIG. 1 may be produced by extrusion as a singular film without adjacent layers (e.g., skin layers). Having produced the singular film, it is contemplated that the singular film may then be combined with other layers (which may themselves be films or other materials) to produce a multi-layered product. For example, the layers could be laminated together. Thus, it should be clear that the layers need not be co-extruded, but can be incorporated in different ways, such as though thermal bonding lamination, bonding, adhesion, or stitching.

In one embodiment, a film having the opacity characteristics disclosed herein may include or otherwise be associated with an object that is made selectively visible by the film. The object may generally take the form of a color, pattern or image that can be discerned when the film is made sufficiently transparent by stretching the film, as will be explained in more detail below. Illustrative embodiments will now be described with respect to FIGS. 3A-B through FIG. 6A-B.

Figure 3A:
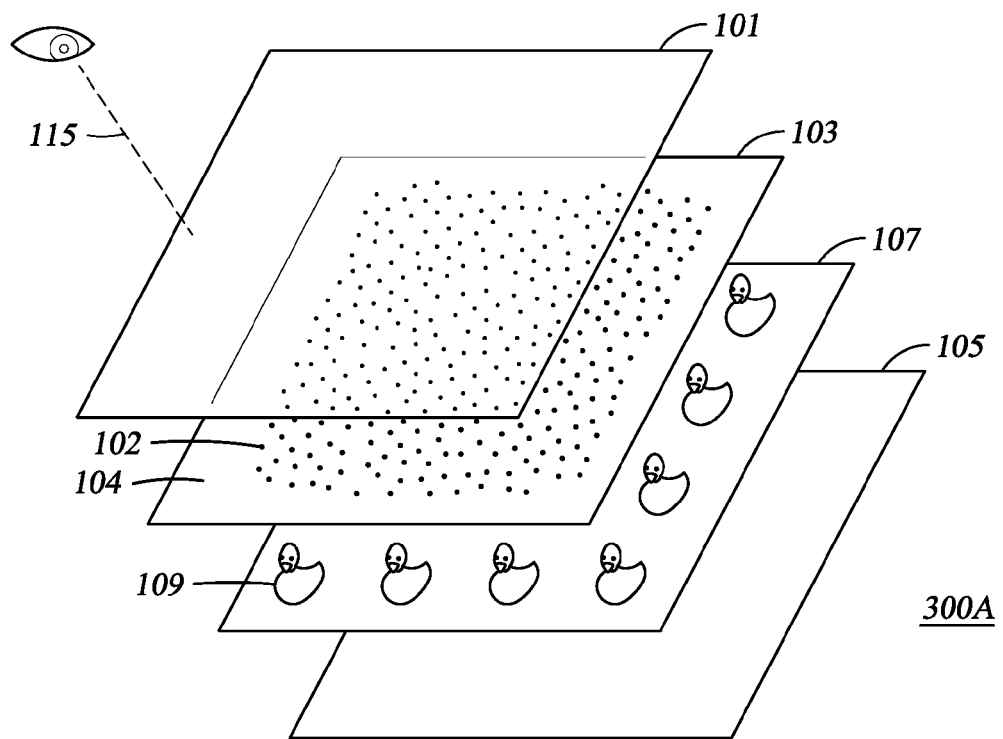
FIGS. 3A and 3B illustrate a perspective view of two films, according to embodiments of the invention.

FIG. 3A depicts a film 300A according to an embodiment of the invention. The film 300A includes each of the components of film 100 described above (like reference numbers correspond to like components) and a fourth layer 107. The fourth layer 107 may be made from similar or the same materials as described in relation to the first layer 101, the second layer 103, or the third layer 105. Additionally, the fourth layer 107 may include color pigments disposed within the layer. In one embodiment, the fourth (or image) layer 107 may include a graphic design 109, such as a cartoon character, logo, or printed words.

For purposes of illustration only, the object 109 shown in FIG. 3A is a depiction of a toy rubber duck. However, as noted above, the object 109 may be any visually discernible attribute. Accordingly, the object 109 need not be a discrete object, nor need the object be uniformly arranged, as is the case with the object 109 (rubber duck) shown in FIG. 3A. For example, the object 109 may be randomly applied areas of color. Alternatively, the entire fourth layer 107 may be dyed with a color, such that the entire fourth layer 107 is the object 109.

In one embodiment, film 300A may be made through the coextrusion process described in reference to FIG. 2. All layers of the film 300A may be coextruded to form the film. The first and second layers 101 and 105 may both be optional skin layers, and the skin layer materials may be combined in the hopper 32A, or divided into two hoppers, each connected to opposing slots on the die in the coextruder 34. The materials required to form the core layer 103 may be combined in the hopper 32B, which may be connected to a die slot in between the skin die slots. The materials required to form the fourth layer 107 may be combined in a third hopper (not shown), which may be connected to a die slot next to the layer 103 die slot. Thus, all four layers may be coextruded through the coextruder 34. The layers may be extruded at speeds between about 30 feet/min and about 60 feet/min.

In one embodiment, the fourth layer 107 may include one or more color pigments. Multiple color pigments may be used in order to create different shades of color or to create a marble color effect. In a relaxed state, the second layer 103 may be opaque, thus obscuring the color of the fourth layer 107. Upon the stretching of the film 300A, the second layer 103 undergoes a non-linear reduction in opacity, and as a result, the fourth layer 107 becomes visible revealing the color of the fourth layer 107.

In another embodiment of the film 300A, the fourth layer 107 may include the object 109. Such a film may be formed by extruding the second layer 103 (a core layer) either alone, or coextruding it with for example the first layer 101. The fourth layer 107 may be a separately extruded film, a woven or nonwoven material or layer, or any other form of layer or object suitable to be combined with the second layer 103. In one embodiment, the object 109 may be printed, stitched, applied, or otherwise adhered on to the fourth layer 107. In another embodiment, the fourth layer 107 may consist of only the object 109 which may be a decal, or a series of decals affixed in between the fourth layer 107 and the third layer 105. The layers may be adhered to the core by thermal bonding lamination, adhesive bonding, stitching, and so forth. In one embodiment the third layer 105 may be an upper surface of an underlying article such as a bandage, absorbent article (e.g. a diaper), and so forth.

Figure 3B:
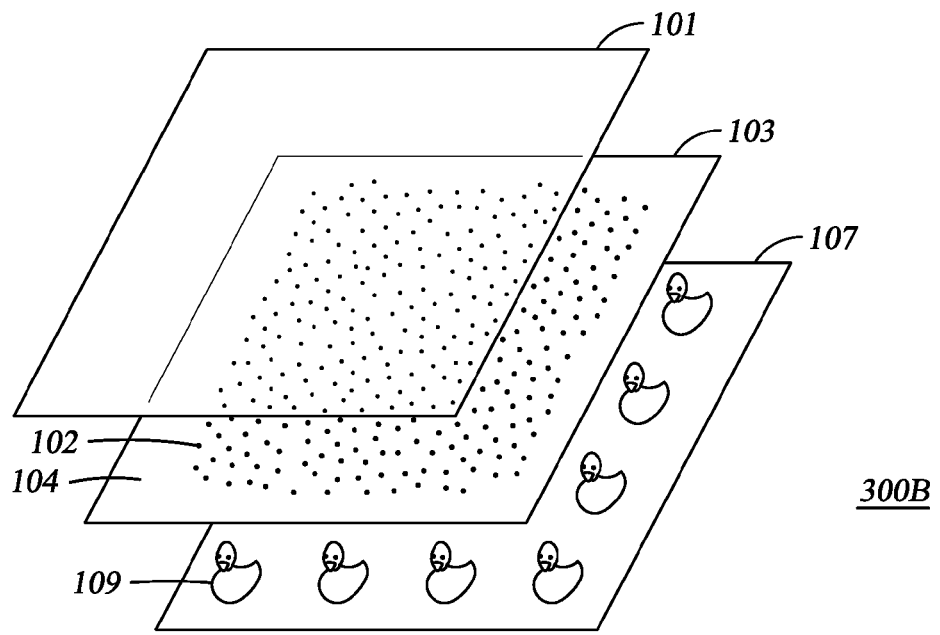

FIG. 3B depicts a film 300B according to an embodiment of the invention. The film 300B may include the first layer 101 which may be an optional skin layer, the second layer 103, and the fourth layer 107. The fourth layer 107 may be a skin layer which includes color pigments, an object 109, or a combination of both. The layers may be coextruded or extruded or formed separately and then layered through thermal bonding lamination, adhesive bonding, stitching, and so forth. In other embodiments, the fourth layer 107 may be an upper surface of an underlying article such as a bandage, absorbent article (e.g. a diaper), and so forth.

In a relaxed state, the second layer 103 may be opaque, thus obscuring the color of the fourth layer 107. Upon the stretching of the film 300B, the second layer 103 undergoes a non-linear reduction in opacity, and as a result, the fourth layer 107 becomes visible revealing the color of the fourth layer 107.

The change in opacity responsive to the film 300A-B being stretched will now be described with respect to FIGS. 4A and 5A. For convenience, the films 300A-B will be collectively referred to as "film 300". FIGS. 4A and 5A show a top view of the film 300 with the fourth layer 107 being disposed below the core layer 103 and the top skin layer 101. Thus, the film is being viewed in the direction 115 shown in FIG. 3A. FIGS. 4A and 5A depict the film 300 in a relaxed opaque state, according to an embodiment. The graphic design 109 is not visible due to the opaque state of the second layer 103. According to various embodiments, a non-linear reduction in opacity in response to stretching the film may occur as the film is stretched in either a machine direction 403 (FIG. 4A), a cross direction 503 (FIG. 5A), or a combination of both. Upon the film 300 being stretched a threshold length (i.e., over at least the first and second elongation ranges), the second layer 103 has a significant reduction in opacity so as to render the second layer 103 increasingly transparent (FIGS. 4B and 5B). It is thus possible to observe the object or graphic behind film 300, or possible to observe the graphic design 109 of the fourth layer 107. Upon subsequent relaxation of the film 300, the second layer 103 again turns opaque (FIGS. 4A and 5A) and the object or graphic design 109 may not be visible.

In another embodiment, the second layer 103 itself may contain an visually discernible element, such as the object 109. Thus, the film would include the polymer medium 104, the crystallites 102 (both shown in FIG. 1) and one or more visually discernible elements disposed in the medium. The visually discernible element may or may not be visible when the film is in a relaxed state. In this way, the visually discernible element may become visible as the film is stretched (in the case where the visually discernible element is not visible when the film is in a relaxed state) or the visually discernible element may become accentuated by virtue of a change in contrast between the element and the film as the film is stretched to become transparent.

In one embodiment, a film exhibiting such non-linear reversible changes in opacity may be incorporated into various article of manufacture. For example, the film may be used in adult incontinence products, sanitary napkins, disposable diapers, garments, and protective gear. Furthermore, the film may be incorporated into medical products, such as bandages, surgical gowns, surgical drapes, facemasks, head coverings, surgical caps, shoe coverings, sterilization wraps, surgical gloves, dilatation balloons, inflatable cuffs, external catheters, catheter balloons, instrument covers, warming blankets, heating pads, and so forth. The film may have particular utility as an indicator in such articles of manufacture. In such embodiments, the indicator may visually represent two or more states to a user, where the indicator transitions from one state to another by changing in degree of opacity. The appearance of a graphic design (e.g., the graphic design 109 of FIGS. 3-5) may be used as an indicator to signify that the film has obtained a desired maximum or desired minimum elongation, depending on the specific use of film.

In one embodiment, one or more of the films described above 300A or 300B may be incorporated into a bandage. In this case, the bandage, the film and an indicator element (e.g., an object or color) are functionally related such that the film and the indicator element provide a first visually discernible state when the film (and bandage) is at the first length and a second visually discernible state when the film (and bandage) is stretched to the second length, whereby the degree to which the film is stretched is visually indicated. The change between the visually discernible states (e.g., appearance of graphic design 109) may indicate that the bandage is stretched too tight and must be loosened so as to, for example, allow sufficient blood circulation. Alternatively, change between the visually discernible states may indicate that a bandage is stretched and fastened tight enough so as to, for example, stop bleeding from a cut or wound.

Figure 6A:
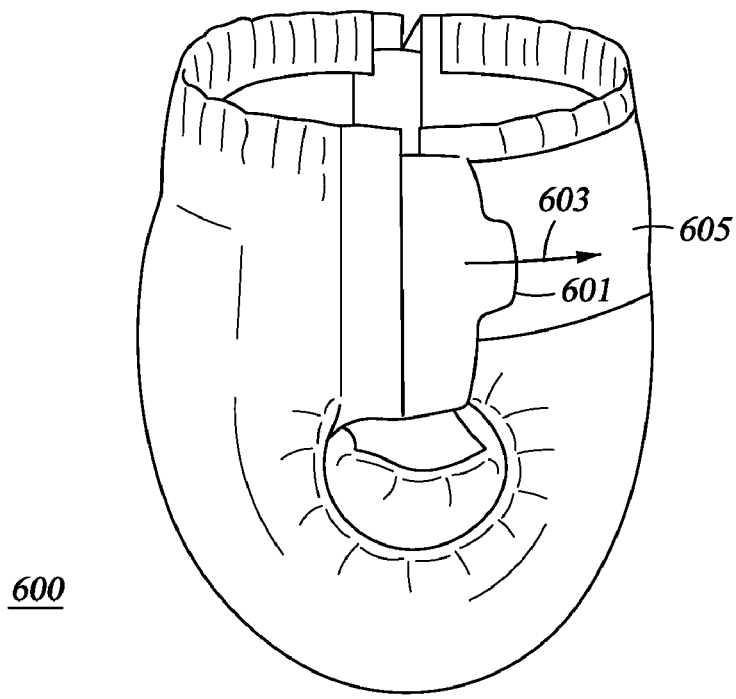
FIGS. 6A and 6B depict a disposable diaper having a stretchable fastening mechanism, according to one embodiment of the invention.
Figure 6B:
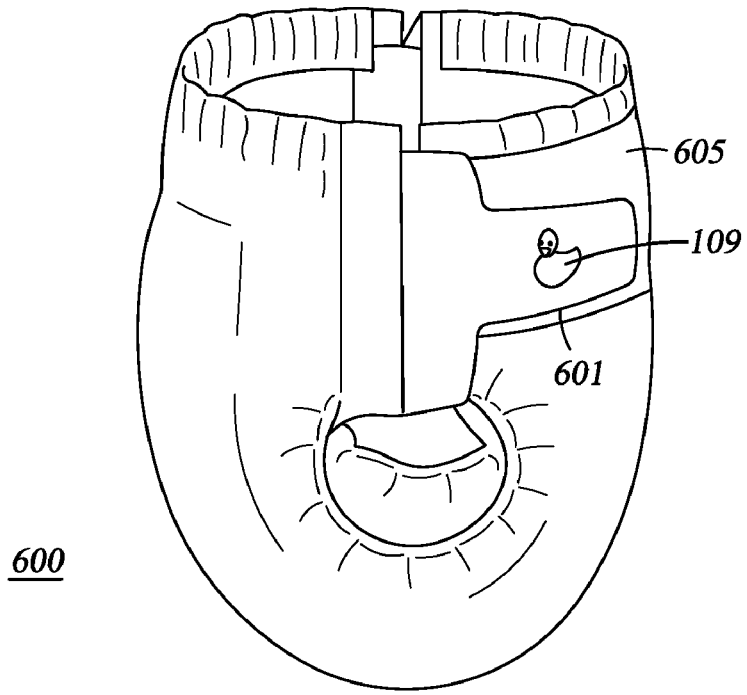

In another embodiment, one or more of the films described above 300A or 300B may be incorporated into a diaper. FIG. 6A depicts a diaper 600 according to an embodiment of the invention. The diaper may generally include one or more layers including an outer cover, a liquid permeable bodyside liner, and absorbent core or liquid retention structure. The diaper 600 includes a fastening mechanism 601 which may be stretched in a direction 603 and affixed to a front part 605 of the diaper by means of adhesives, fabric hook-and-loop fasteners (such as VELCRO), or a combination of both. The fastening mechanism 601 may include a film such as the film 300. The fastening mechanism 601 when in an unstretched or relaxed state will then include an opaque second layer 103. Upon the fastening mechanism 601 being stretched a predetermined amount (FIG. 6B), a non-linear reduction of opacity occurs in the second layer 103, and the graphic design 109 becomes visible. The appearance of the graphic design 109 may indicate that the diaper is fastened too tight and must be loosened so as to, for example, increase the comfort level of a baby wearing the diaper. Alternatively, the appearance of the graphic design 109 may indicate that the diaper is fastened tight enough to prevent leaking upon being soiled. If using the film on children's products it is contemplated that the graphic design 109 may include cartoon characters.

Example

In one embodiment of the invention a film was synthesized as described in relation to FIG. 2. The following resins were combined in a hopper and extruded at about 400° F. through a standard film die at a through speed of about 51 feet/min onto a casting roll maintained at about 70° F.:

Low crystallinity transparent elastomer: Exact 5361, about 86 wt %,
Medium crystallinity elastomer: Vistamaxx 1100, about 10 wt %, and
Crystallite: PP 3155, about 4 wt %.

Exact 5361, Vistamaxx 1100, and PP 3155 are polymer resins manufactured by ExxonMobil Chemical. Exact 5361 is an ethylene octene copolymer with a melt index of 3 g/10 min at 190° C. and a melt flow rate of 5.6 g/10 min at 230° C. and a polymer density of 0.86 g/cm$^3$. Vistamaxx 1100 is an olefin elastomer with a melt index of 3 g/10 min at 190° and a polymer density of 0.86 g/cm$^3$ which exhibits propylene type of crystallinity. 3155 PP is a fiber grade polypropylene with a melt flow rate of 35 g/10 min at 230° C. and a polymer density of 0.90 g/cm$^3$.

A skin layer (Dowlex 2036G, about 2 wt %) was extruded onto both sides of the polymer blend film (about 1 wt % on each side). Dowlex 2036G is a film grade linear low density polyethylene manufactured by Dow Chemical, and has a melt index of 2.5 g/10 min at 190° C. and a polymer density of 0.935 g/cm$^3$.

The resulting film was originally visually transparent, but after stretching the film one time from an original length of about 2.5 inches to about 7.5 inches at room temperature and upon relaxation of the film, the relaxed film had a length of about 3.5 inches and was visually opaque having a milky white color.

Opacity measurements were performed on the film according to a TAPPI 519 Diffuse opacity method as supplied on a Datacolor Spectraflash® SF600-CT spectrophotometer loaded with Datacolor Colortools software version 3.0.3 build 0074. The film (4"×4") was clamped in a jig at 3.5 inch spacing with no elongation of the film, and the opacity was measured using a standard white background traceable to the National Institute of Standards and Technology (NIST) and a black background. Both backgrounds were supplied with the spectrophotometer. The film was then elongated or stretched on the jig and the opacity measured at several elongation points (every ¼ inch) using the standard white and black backgrounds.

Figure 7:
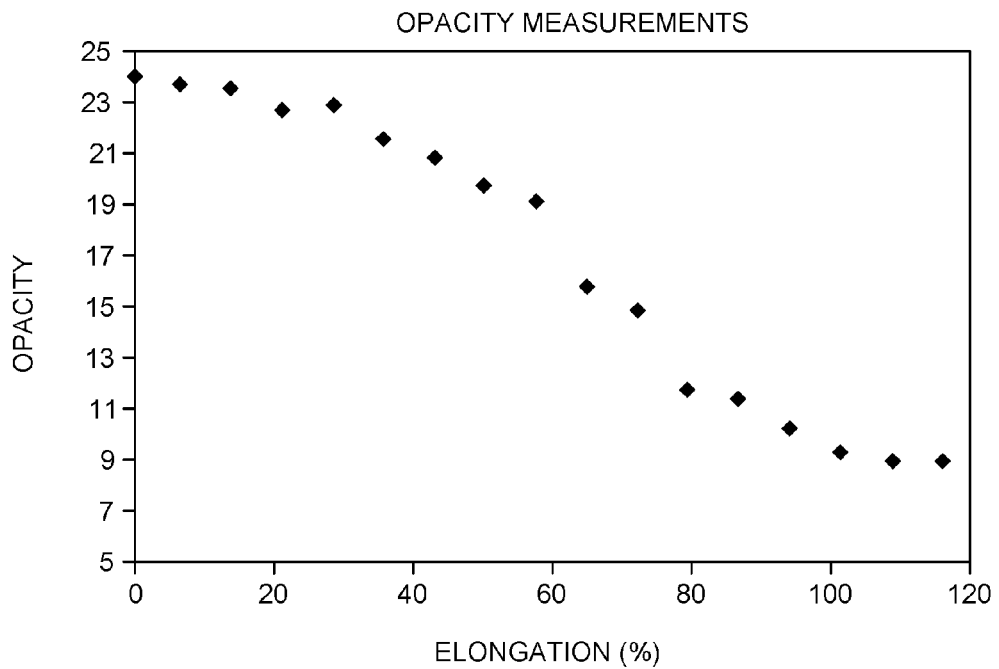
FIG. 7 depicts a plot of opacity measurements of a film, according to one embodiment of the invention.

FIG. 7 shows a plot of the measured opacity (y-axis) versus elongation (x-axis) as determined by the Colortools software. The plot shows a non-linear response in opacity to the elongation, with a dramatic change in opacity over a short elongation range (between about 60% and about 75%).

Figure 8:
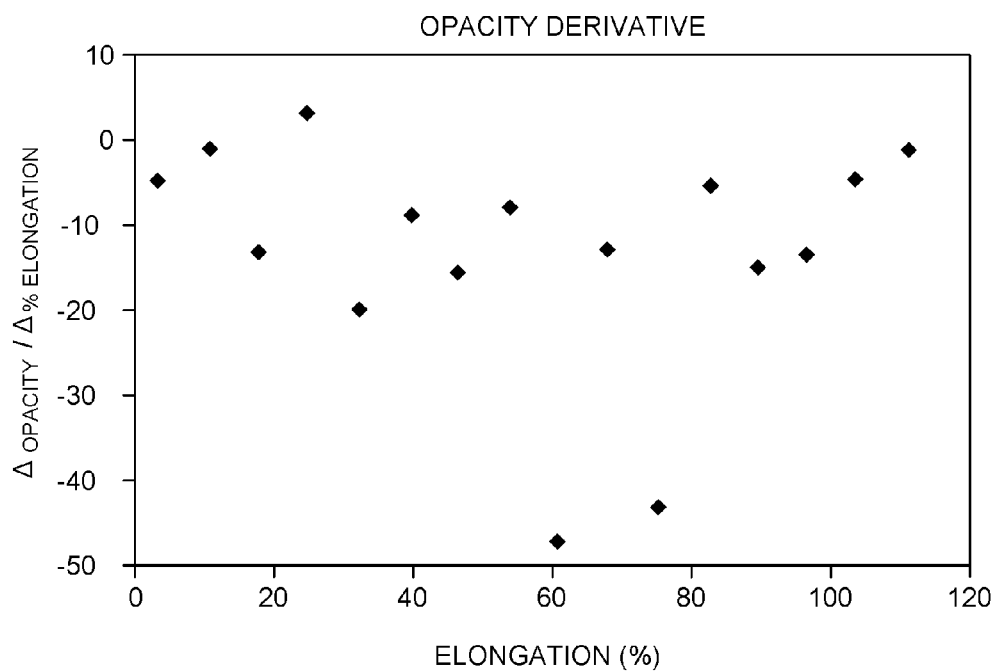
FIG. 8 depicts a plot of the derivative of opacity measurements of a film, according to one embodiment of the invention.

FIG. 8 shows the derivative of the measured opacity versus elongation. It can be seen that in a first elongation range, between about 0% elongation and about 60% elongation, the film has first rate of opacity decrease of between about 0 and about $-20$ $\Delta_{Opacity}/\Delta_{\% \ Elongation}$, and an about $-7.5$ average $\Delta_{Opacity}/\Delta_{\% \ Elongation}$. The decrease in opacity in the first elongation range is relatively slow and not readily observed by the naked eye. In a second elongation range, between about 60% elongation and about 75% elongation, the film has second rate of opacity decrease of between about $-20$ and about $-50$ $\Delta_{Opacity}/\Delta_{\% \ Elongation}$, and an about $-34$ average $\Delta_{Opacity}/\Delta_{\% \ Elongation}$ which is between about 2 times and about 5 times the first rate of opacity decrease. The change in opacity over the second elongation rate is visible to the naked eye, and the film appears to change from an opaque state to a transparent state allowing an observer to see through the film. In a third elongation range, above about 80% elongation, the film has a third rate of opacity decrease of between about 0 and about $-20$ $\Delta_{Opacity}/\Delta_{\% \ Elongation}$, and an about $-8$ average $\Delta_{Opacity}/\Delta_{\% \ Elongation}$, similar to the first rate of opacity decrease. Between about 105% elongation and about 120% elongation the decrease in opacity tapers off.

While the foregoing is directed to embodiments of the present invention, other and further embodiments of the invention may be devised without departing from the basic scope thereof, and the scope thereof is determined by the claims that follow.

What is claimed is:

1. A film, comprising:
 a first elastomeric polymer; and
 a second polymer having a plurality of crystallites and one of crystalline and semicrystalline properties, wherein the second polymer forms crystalline regions disposed in the first polymer, and the film exhibits a reversible non-linear reduction in opacity as the composition is stretched from a first length where a first spacing between the crystallites diffracts light such that the film is substantially opaque to a second length where a second spacing between the crystallites allows light to pass through the film such that the film is substantially transparent, wherein the crystallites are spaced farther apart in the second spacing than in the first spacing, wherein the reversible non-linear reduction in opacity comprises a first rate of opacity reduction and a second rate of opacity reduction, wherein the second rate of opacity reduction is at least about 2 times greater than the first rate of opacity reduction.

2. The film of claim 1, wherein the first polymer comprises an ethylene octene copolymer.

3. The film of claim 2, wherein the second polymer comprises at least one polypropylene.

4. The film of claim 3, further comprising at least one olefin elastomer disposed in the first polymer.

5. The film of claim 1, wherein the reversible non-linear reduction in opacity occurs upon the film being stretched between about 1.5 times the first length of the film and about 2 times the first length of the film.

6. The film of claim 1, wherein the reversible non-linear reduction in opacity comprises a third rate of opacity reduction.

7. The film of claim 1, wherein the second rate of opacity reduction is between about 2 times and about 5 times greater than the first rate of opacity reduction.

8. The film of claim 1, wherein the first rate of opacity reduction is above $-20\Delta_{Opacity}/\Delta_{\% \, Elongation}$.

9. The film of claim 8, wherein the second rate of opacity reduction is below $-20\Delta_{Opacity}/\Delta_{\% \, Elongation}$.

10. The film of claim 1, further comprising a skin layer on at least one surface of the film.

11. The film of claim 1, wherein, prior to exhibiting the reversible non-linear reduction in opacity, the film exhibits a non-reversible increase in opacity upon being stretched from the first length to the second length and subsequently relaxed.

12. An article, comprising:
 a film core comprising at least one polypropylene having crystalline properties and a plurality of crystallites and at least one olefin elastomer suspended in at least one ethylene octene copolymer the film core exhibiting a reversible non-linear reduction in opacity comprising a first rate of opacity reduction and a second rate of opacity reduction, the second rate of opacity reduction being at least about 2 times greater than the first rate of opacity reduction, wherein when the film core is at a first length a first spacing between the crystallites diffracts light such that the film core is substantially opaque and wherein when the film core is stretched to a second length a second spacing between the crystallites allows light to pass through the film such that the film is substantially transparent, wherein the crystallites are spaced farther apart in the second spacing than in the first spacing; and
 a polyethylene skin layer on at least one surface of the film core.

13. The article of claim 12, wherein the film core has a polypropylene to ethylene octene ratio such that the film core exhibits the reversible non-linear reduction in opacity as the film core is stretched from the first length to the second length.

14. The article of claim 13, wherein, prior to exhibiting the reversible non-linear reduction in opacity, the composition exhibits a non-reversible increase in opacity upon being stretched from the first length to the second length and subsequently relaxed.

15. The article of claim 13, wherein the reversible non-linear reduction in opacity occurs upon the article being stretched between about 1.5 times the first length of the composition and about 2 times the first length of the composition.

16. The article of claim 13, wherein the reversible non-linear reduction in opacity further comprises a a third rate of opacity reduction.

17. The article of claim 12, wherein the second rate of opacity reduction is between about 2 times and about 5 times greater than the first rate of opacity reduction.

18. The article of claim 13, wherein the article comprises at least one of adult incontinence products, sanitary napkins, disposable diapers, garments, protective gear, bandages, surgical gowns, surgical drapes, facemasks, head coverings, surgical caps, shoe coverings, sterilization wraps, surgical gloves, dilatation balloons, inflatable cuffs, external catheters, catheter balloons, instrument covers, warming blankets, or heating pads, having the combination of the film core and the polyethylene skin layer disposed thereon.

19. The article of claim 18, wherein the article comprises a disposable diaper and wherein the film core has a polypropylene to ethylene octene ratio such that the film core exhibits the reversible non-linear reduction in opacity as the film core is stretched from the first length to the second length; wherein the combination of the film core and the polyethylene skin layer forms a visual indicator disposed on the disposable diaper and configured to indicate a degree to which the film core is stretched as the film core is made increasingly transparent by being stretched from the first length to the second length.

20. The article of claim 18, wherein the article comprises a bandage and wherein the film core has a polypropylene to ethylene octene ratio such that the film core exhibits the reversible non-linear reduction in opacity as the film core is stretched from the first length to the second length; wherein the combination of the film core and the polyethylene skin layer forms a visual indicator disposed on the bandage and configured to indicate a degree to which the film core is stretched as the film core is made increasingly transparent by being stretched from the first length to the second length.

21. The article of claim 12, further comprising an object disposed proximate the film core and being visually obscured by the film core at the first length, and wherein the film core has a polypropylene to ethylene octene ratio such that the film core exhibits the reversible non-linear reduction in opacity as the film core is stretched from the first length to the second length, the film core becoming increasingly transparent by being stretched from the first length to the second length to reveal the object.

22. A method for use of a film, comprising:
applying a first stretching force to the film so as to stretch the film from a first length to a second length, wherein the film comprises an elastomeric polymer having a plurality of crystallites with crystalline properties suspended in the elastomeric polymer;
releasing the stretching force to relax the film to a relaxed state where a first spacing between the crystallites diffracts light such that the film is substantially opaque; and
applying a second stretching force to the film, wherein the film exhibits a reversible non-linear reduction in opacity as the film is stretched from the relaxed state to a stretched state where a second spacing between the crystallites allows light to pass through the film such that the film is substantially transparent in said stretched state after applying the second stretching force, wherein the crystallites are spaced farther apart in the second spacing than in the first spacing the reversible non-linear reduction in opacity comprising a first rate of opacity reduction and a second rate of opacity reduction, the second rate of opacity reduction is at least about 2 times greater than the first rate of opacity reduction.

23. The method for use of claim 22, further comprising: releasing the second stretching force, thereby allowing the film to return to the relaxed state in which the film is substantially opaque.

24. The method for use of claim 23, wherein the reversible non-linear reduction in opacity occurs upon the film being stretched between about 1.5 times a length of the relaxed state and about 2 times the length of the relaxed state.

25. The method for use of claim 24, wherein the reversible non-linear reduction in opacity further comprises a a third rate of opacity reduction, wherein the third rate of opacity reduction is less than the second rate of opacity reduction.

26. The method of claim 22, wherein the second rate of opacity reduction is between about 2 times and about 5 times greater than the first rate of opacity reduction.

27. An article, comprising:
a bandage; and a film disposed on the bandage, the film comprising:
a first elastomeric polymer; and
a second polymer having one of crystalline and semicrystalline properties, wherein the second polymer forms crystalline regions having a plurality of crystallites disposed in the first polymer, and the film exhibits a reversible non-linear reduction in opacity as the composition is stretched from a first length where a first spacing between the crystallites diffracts light such that the film is substantially opaque to a second length where a second spacing between the crystallites allows light to pass through the film such that the film is substantially transparent, wherein the crystallites are spaced farther apart in the second spacing than in the first spacing the reversible non-linear reduction in opacity comprising a first rate of opacity reduction and a second rate of opacity reduction, the second rate of opacity reduction being at least about 2 times greater than the first rate of opacity reduction.

28. The article of claim 27, further comprising:
an indicator element functionally related to the film such that the film and indicator element provide a first visually discernible state when the film is at the first length and a second visually discernible state when the film is at the second length, whereby the degree to which the film is stretched is visually indicated.

29. A disposable diaper comprising;
an outer cover having an indicator element disposed thereon;
a liquid permeable bodyside liner;
an absorbent core; and
a fastening mechanism, the fastening mechanism having a film comprising:
a first elastomeric polymer;
a second polymer having a plurality of crystallites and one of crystalline and semicrystalline properties, wherein the second polymer forms crystalline regions disposed in the first polymer, and the film exhibits a reversible non-linear reduction in opacity as the composition is stretched from a first length where a first spacing between the crystallites diffracts light such that the film the reversible non-linear reduction in opacity comprising a first rate of opacity reduction and a second rate of opacity reduction, the second rate of opacity reduction being at least about 2 times greater than the first rate of opacity reduction is substantially opaque to a second length where a second spacing between the crystallites allows light to pass through the film such that the film is substantially transparent, wherein the crystallites are spaced farther apart in the second spacing than in the first spacing, the film being adapted to at least partially overlie the indicator element disposed on the outer cover, wherein when the film is at the first length the indicator element is not visible through the film and when the film is at the second length the indicator element is visible through the film.

* * * * *